United States Patent [19]

Lacquement

[11] 4,131,161
[45] Dec. 26, 1978

[54] RECOVERY OF DRY STEAM FROM GEOTHERMAL BRINE

[75] Inventor: Ralph G. Lacquement, Bartlesville, Okla.

[73] Assignee: Phillips Petroleum Company, Bartlesville, Okla.

[21] Appl. No.: 827,518

[22] Filed: Aug. 25, 1977

[51] Int. Cl.$^2$ .................... E21B 39/00; E21B 43/00
[52] U.S. Cl. ..................................... 166/265; 166/53; 166/222; 166/314
[58] Field of Search ............... 166/265, 266, 311, 314, 166/54, 105.5, 222; 60/641; 165/45

[56] References Cited

U.S. PATENT DOCUMENTS

| | | | |
|---|---|---|---|
| 1,639,734 | 8/1927 | Jones | 166/105.5 |
| 2,077,912 | 4/1937 | Voorhis | 166/265 |
| 2,986,215 | 5/1961 | Barr | 166/54 X |
| 3,470,943 | 10/1969 | Van Huisen | 165/45 |
| 3,624,822 | 11/1971 | Carle et al. | 166/105.5 X |
| 3,782,468 | 1/1974 | Kuwada | 166/265 X |
| 3,975,912 | 8/1976 | Greene | 60/641 |
| 4,043,129 | 8/1977 | McCabe et al. | 166/314 X |
| 4,044,830 | 8/1977 | Van Huisen | 60/641 X |
| 4,057,964 | 11/1977 | Hutchinson | 60/641 |
| 4,059,156 | 11/1977 | Berg | 166/314 |
| 4,074,763 | 2/1978 | Stevens | 166/105.5 X |

Primary Examiner—Stephen J. Novosad
Assistant Examiner—George A. Suchfield

[57] ABSTRACT

An apparatus in which a casing pipe closed at both its ends extends from the surface of the earth into a formation producing geothermal brine. The casing pipe contains a string of pipe of lesser diameter extending through the closed ends of the casing pipe thereby forming an annular conduit between the pipes. The casing pipe contains openings that are located to be situated in the upper portion of the producing formation. The string of pipe is open at its lower end, is terminated at its upper end outside the casing pipe with a means for controlling flow, and contains a means for separating brine from vapor. The means for separating brine from vapor has means for discharging liquid into the annular conduit and for passing vapor into the portion of the string of pipe downstream of the separating means. In operation, geothermal brine passes through the string of pipe to the separating means with dry steam passing into the portion of the string of pipe downstream of the separating means and brine from which the steam has been separated returning to the producing formation by way of the annular conduit. Back pressure is maintained on the produced steam using a flow control means on the string of pipe.

7 Claims, 1 Drawing Figure

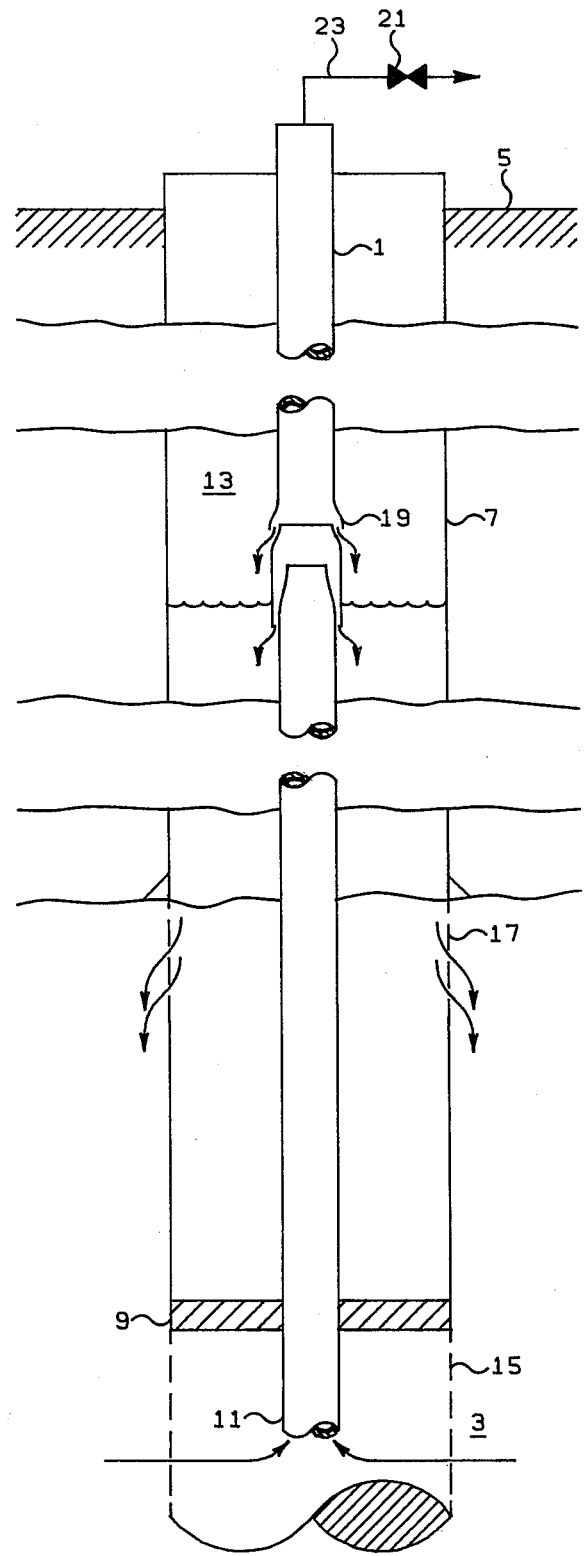

RECOVERY OF DRY STEAM FROM GEOTHERMAL BRINE

BACKGROUND OF THE INVENTION

This invention relates to geothermal energy. In one of its aspects this invention relates to the separation of produced steam from geothermal brine.

In many areas of the world, including much of the western part of the United States, geothermal energy is an abundant energy resource. In spite of this abundance, however, exploitation of this source of energy has been limited for two primary reasons: (1) most geothermal energy is relatively low grade energy which is generally available only at temperatures below 600° F (316° C) and only rarely being available as dry steam and (2) the generally available geothermal well products of wet steam and superheated brine contain large quantities of salts which present a brine disposal problem because the fluids are corrosive.

A method and apparatus for tapping the geothermal energy supply to produce a dry steam product is, therefore, of great commercial importance.

It is therefore an object of this invention to provide a method for recovering dry steam from geothermal brine. It is a further object of this invention to provide a method and apparatus for flashing geothermal brine without bringing it to the surface using conditions which permit returning the flashed brine to the producing formation by gravity so that the need for a brine injection pump is obviated.

Other aspects, objects, and the various advantages of this invention will become apparent upon studying this specification, its drawing, and the appended claims.

STATEMENT OF THE INVENTION

According to this invention an apparatus is provided for recovering dry steam from geothermal brine. In this apparatus a first pipe or casing pipe is extended from the surface of the earth into a producing formation. This pipe is closed at both its ends and contains a second pipe or production string of lesser diameter which extends through the closed ends of the first pipe thereby forming an annular conduit between the outside of the string of pipe and the inside of the casing pipe. The first pipe is provided with openings located in that pipe to be situated in the upper portion of the producing formation. The second pipe is open at the lower end, outside of the first pipe, and at its upper end, outside of the first pipe, terminates with a means for controlling flow therethrough. A means for separation of brine from vapor is located in the second pipe. This means for separation is equipped with means for discharging liquid into the annular conduit and means for passing vapor into the portion of the second pipe downstream of the means for separation.

In a preferred embodiment of this invention a method for recovering dry steam from geothermal brine is provided in which a flow of geothermal brine is established from the producing formation through the production string or second pipe in the apparatus described above into a means for separation of brine from vapor, located in the second pipe, wherein the vapor and brine are separated with the brine being discharged into the annular conduit formed between the two pipes and returning by gravity into the producing formation while steam is directed into that portion of the second pipe that is downstream of the means for separation and is recovered through a flow control means at the outlet of the second pipe.

The invention can be best understood in conjunction with the drawing which is a schematic of the apparatus useful in the method of this invention.

Referring now to the drawing, a normal procedure for providing the apparatus of this invention is to install a production string of piping herein described as the second pipe 1 leading from a point well within the brine producing formation 3 to the surface of the earth 5. This piping is suspended within a much larger pipe 7 or casing, herein called the first pipe, which also leads from the producing formation to the surface. A packer 9 is installed between the production string and the casing at a depth near the mid-point of the brine formation to be produced. This isolates the point of entry into the bottom of the production string 11 from the annular space 13 between the casing 7 and the production string 1 above the packer. The casing is perforated 15 below the packer to provide a passage of brine from the brine reservoir into the production string. At a point 17 above the packer but still within the brine formation, preferably at the highest practicable point in the brine formation, the casing is also perforated to provide for passage of flashed brine from the annular space 13 above the packer into the formation. It is preferable to have the second perforated area some distance above the packer to minimize the tendency of the incoming flashed brine to short-circuit through the formation into the inlet of the production piping.

At an elevation intermediate between the producing formation 3 and the surface 5 a separation device 19 is installed on the production string 1 to provide for the separation of brine and steam. The steam separated will include any steam that was entrained in the brine issuing from the formation plus that flashed from the brine by the time it reaches the separation device. From the separation device steam passes up the production string to the surface for use and the brine flows by gravity through the annular space 13 between the casing and the production string to return to the upper part of the producing formation.

Since the latitudinal space within the casing is limited, a centrifugal type of separator is preferred. One such device which is commercially available is known as a Whirl-A-Way Separator, manufactured by Dyna-Therm Corporation, Houston, Tex. In such a device the centrifugal action is generated by the pressure drop of the fluid passing through the apparatus, thereby obviating the need for supplying external power. Another well-known device which is suitable for operation as a separator in this invention is a cyclone. It is also within the scope of the invention to utilize separation devices which use external power such as an electrically driven centrifuge.

It is also within the scope of the invention to place the separator at the surface but near the wellhead so that flashed brine can flow by gravity back to the formation by means of the annular space between the casing and the production string. In this embodiment a simple separator tank can replace a centrifugal device. This method is, however, generally considered less desirable than what has been hereinbefore described because the increased pressure drop at the production string, caused by the two-phase flow through the entire length of the production string, will result in the production of lower pressure steam.

In actual operation, brine from the producing formation 3 flows through the second pipe 1 to a separating device 19 from which the separated brine is returned through annular space 13 to the formation. In the initial operation there may be some interference in the efficiency of separation of brine and flashed vapor. The system will, however, naturally adjust automatically to provide flow of liquid and vapor up through the string of piping to the separating device. The annular space 13 above the separating device 19 will be vapor space. Back pressure and flow control is provided by a control device, such as an automatically operated valve, 21 in outlet line 23 above the surface of the earth.

The following example is offered to show the interrelation of typical sizing for operation of the apparatus of this invention and typical flows that can be expected therethrough.

EXAMPLE

In a geothermal brine well which has been completed to a depth of about 2900 feet (885 m), the casing has an inside diameter (I.D.) of 24 inches (0.61 m) and the production string has an I.D. of 12 inches (0.305 m). A packer is installed between the casing and the production string at a point about half-way between the bottom of the production string and the top of the producing formation, a distance of about 50 feet (15 m). A Whirl-A-Way Model WLU-10 separator is installed in the production string at an elevation about 640 feet (195 m) above the top of the producing formation. The 505° F (263° C) brine containing about 5500 ppm of dissolved salts is produced at a rate of 2,572,000 lb/hr (324 kg/s) and at a flowing pressure of 443 psia (2.98 MPa). At the separator pressure of 415 psia (2.86 MPa) the dry steam production is 230,000 lb/hr (29.0 kg/s) which is yielded at the surface at a pressure of 335 psia (2.31 MPa).

I claim:

1. An apparatus for recovering dry steam from geothermal brine comprising:
   (1) a first pipe extending from the surface of the earth into a producing formation, said pipe closed at both ends and containing a second pipe of lesser diameter extending through the closed ends of said first pipe thereby forming an annular conduit between the pipes, said first pipe containing openings located in the pipe to be situated in the upper portion of said producing formation;
   (2) said second pipe open at the lower end and at its upper end outside said first pipe terminated with a means for controlling flow therethrough; and
   (3) a means for separation of brine from vapor, said means for separation located in said second pipe with means for discharging liquid into said annular conduit and passing vapor into the portion of said second pipe downstream of said means for separation.

2. An apparatus of claim 1 wherein the lower end of said first pipe is closed with a packer.

3. An apparatus of claim 1 wherein said means for separation of brine from vapor is a centrifugal separator.

4. An apparatus of claim 3 wherein the centrifugal action of said separator is generated by the pressure drop of the fluid passing through the apparatus.

5. A method for recovering dry steam from geothermal brine comprising:
   (1) establishing flow of geothermal brine from a producing formation through the second pipe of an apparatus into a means for separation of brine from vapor located in said second pipe said apparatus comprising:
      (a) a first pipe extending from the surface of the earth into a producing formation, said pipe closed at both ends and containing a second pipe of lesser diameter extending through the closed ends of said first pipe thereby forming an annular conduit between the pipes, said first pipe containing openings located in the pipe to be situated in the upper portion of said producing formation;
      (b) said second pipe open at the lower end and at its upper end outside said first pipe terminated with a means for controlling flow therethrough; and
      (c) a means for separation of brine from vapor, said means for separation located in said second pipe with means for discharging liquid into said annular conduit and passing vapor into the portion of said second pipe downstream of said means for separation;
   (2) separating the vapor and brine in said means for separation;
   (3) discharging separated brine into the annular conduit formed between the two pipes;
   (4) returning said separated brine by gravity flow into the producing formation;
   (5) directing separated steam into the portion of the second pipe that is downstream of the means for separation; and
   (6) recovering said steam through a flow control means at the outlet of the second pipe.

6. A method of claim 5 wherein said means for separation of brine from vapor is a centrifugal separator.

7. A method of claim 5 wherein the centrifugal action of said separator is generated by the pressure drop of the fluid passing through the apparatus.

* * * * *